Patented Jan. 19, 1954

2,666,748

UNITED STATES PATENT OFFICE 2,666,748

HYDROGEN CYANIDE-COBALT CARBONYL REACTION PRODUCT

Paul Arthur, Jr., and Burt Carlton Pratt, Wilmington, Del., assignors to E. I. du Pont de Nemours & Company, Wilmington, Del., a corporation of Delaware No Drawing. Original application January 7, 1950, Serial No. 137,481. Divided and this application February 7, 1952, Serial No. 270,524

1 Claim. (Cl. 252—438)

This invention relates to a new process for preparing nitriles by addition of hydrogen cyanide to olefinic bonds, and to new catalysts for carrying out this reaction.

This application is a division of our application Serial Number 137,481, filed January 7, 1950.

It is known that addition of hydrogen cyanide to activated double bonds, i. e., to ethylenic bonds adjacent to an activating group such as the nitrile or acyloxy groups, proceeds with relative ease. On the other hand, it is extremely difficult to add hydrogen cyanide to a double bond in a mono or polyolefinic hydrocarbon where no such activating influence exists. It has been pointed out by Migrdichian in his recent book "Chemistry of Organic Cyanogen Compounds" (A. C. S. Monograph 105, page 219) that addition of hydrogen cyanide to olefins, if it proceeds at all, requires high pressures, of the order of 1000 lbs./sq. in. or more, and high temperatures within the range of 200–400° C. Hydrogen cyanide adds to conjugated diolefins (which have activated double bonds) in the presence of cuprous chloride catalysts, as described for example in U. S. Patents 2,422,859 and 2,447,600, with production of 1,4-addition products and the so-called "normal" 1,2-addition products, i. e., the products wherein the cyano group is attached to the carbon atom bearing the least number of hydrogen atoms. No instance has been reported of the so-called "abnormal" or "reverse" addition, i. e, attachment of the cyano group to the carbon bearing the most hydrogen atoms.

This invention has as an object the addition of hydrogen cyanide to ethylenic bonds. A further object is the provision of a process operating at relatively low temperatures and at pressures as low as the autogenous pressure of the reactants. Another object is the addition of hydrogen cyanide to non-activated ethylenic bonds such as are present in monoolefinic hydrocarbons. A further object is a process whereby hydrogen cyanide is added to an olefin having an unsymmetrical ethylenic linkage, the addition taking place in the "abnormal" or "reverse" manner, i. e., with the cyano group attaching to the ethylenic carbon bearing the greater number of hydrogens. A further object is the conjugate (1,4) or non-conjugate (1,2) addition of hydrogen cyanide to a diolefin having the two ethylenic linkages conjugated. A still further object is the provision of new catalysts for the addition of hydrogen cyanide to ethylenic bonds. Other objects will appear hereinafter.

These objects are accomplished by the following invention wherein an ethylenic compound, i. e., a compound having at least one carbon-to-carbon double bond which is ethylenic, i. e., non-aromatic in nature, is reacted with hydrogen cyanide in contact with a cobalt carbonyl catalyst, i. e., a cobalt carbonyl per se or a complex thereof. Particularly effective cobalt carbonyl complexes are those formed by reaction of cobalt carbonyl with hydrogen cyanide. These products are new and they form part of this invention.

The ethylenic compound and the hydrogen cyanide are suitably employed in approximately equimolar proportions; but if desired either reactant can be present in excess, which may be large, e. g., 2 to 10 moles per mole. However, when the ethylenic compound is readily polymerizable (for example, 1,3-butadiene) it may be preferred not to use an excess of it since, while a higher conversion of the hydrogen cyanide may be obtained, there may also be an increase in the formation of polymeric residues.

The catalysts suitable for the process of this invention are cobalt carbonyl catalysts, i. e., the catalysts may consist of a cobalt carbonyl or they may comprise cobalt carbonyl. Thus, cobalt carbonyl itself may be used, the most stable form of which is cobalt tetracarbonyl, $Co_2(CO)_8$, which in the pure form is a solid melting at 51° C. However, it is not necessary for the purpose of this process to use the pure compound. Cobalt tricarbonyl may be used instead of or in addition to cobalt tetracarbonyl.

There may also be used as catalysts the cobalt carbonyl complexes which are the reaction products of cobalt carbonyl with hydrogen cyanide. These reaction products, which have not heretofore been described in the chemical literature, are formed by adding cobalt tetracarbonyl to liquid hydrogen cyanide at any desired temperature between about 0° C. and about 200° C. The cobalt carbonyl dissolves in the hydrogen cyanide and reacts with it with evolution of hydrogen and carbon monoxide and deposition of a finely divided blue-purple solid. The solid reaction product is similar in appearance to cobalt cyanide, and like cobalt cyanide it dissolves in 10% aqueous potassium cyanide solution at room temperature, and the solution when heated gives potassium cobalticyanide, $K_3Co(CN)_6$. However, the cobalt carbonyl-hydrogen cyanide complexes are quite different analytically from cobalt cyanide. The latter contains 53.1% cobalt and 25.2% nitrogen, whereas the cobalt carbonyl-hydrogen cyanide complexes contain, depending upon the conditions of formation, from 23% to 44% cobalt and from 16% to 38% nitrogen. Moreover, on treatment with potassium cyanide solution to give, as already mentioned, potassium cobalt cyanide, the complexes evolve carbon monoxide, unlike cobalt cyanide. Cobalt cyanide is not a catalyst for the hydrocyanation of olefins, whereas the complexes just described are. It is possible that these compounds are formed in situ whenever an olefin is treated with hydrogen cyanide in the presence of cobalt carbonyl, but this has not been demonstrated.

Other suitable catalysts containing cobalt carbonyl are the heavy metal salts of cobalt carbonyl hydride (Z. Anorg. Chem., 232, 17 (1937)), for example, the mercury salt of cobalt carbonyl hydride, which has the formula $Hg[Co(CO)_4]_2$. Further suitable catalysts are the cobalt carbonyl hydride-butadiene addition products described in application Serial Number 779,837, filed by Prichard on October 14, 1947, now Patent No. 2,600,571, issued June 17, 1952. These latter complexes are formed by reacting butadiene with cobalt carbonyl in the presence of a secondary alcohol and their probable molecular formula is $C_8H_7O_4Co$. On the basis of present information, there may be used as catalyst in the process of this invention any material containing cobalt carbonyl and in which the cobalt content is between about 15% and 45%. The cobalt carbonyl catalyst is used in proportions, based on the ethylenic compound, between about 0.01 and 0.3 mole per mole, although more can be used if desired. A generally useful range is between 0.03 and 0.2 mole of catalyst per mole of unsaturate. Surprisingly, the free metal is ineffective in the hydrocyanation reaction at the low temperatures and pressures at which the cobalt carbonyl catalysts are effective.

The reaction is preferably carried out in a substantially anhydrous medium although some water, for example the small amount (2-3%) present in commercial liquid hydrogen cyanide, is not usually detrimental. Even much larger amounts of water may be present but in such cases the conversion is in general sharply decreased. The highest conversions are observed when the hydrogen cyanide is at least partly dried, for example by passing it through a dehydrating agent, and also when the volatile acidic stabilizers sometimes present in it are at least partly removed, for example by bubbling nitrogen through the hydrogen cyanide for a few minutes.

While the reaction takes place readily without addition of an extraneous solvent, it has been observed that better yields of nitrile sometimes result when the system comprises a solvent for the reactants and catalyst, probably because dilution tends to reduce the formation of polymers. Any aliphatically saturated organic liquid substantially inert towards reactants and catalysts may be used, in particular hydrocarbons such as benzene, toluene, hexane, cyclohexane, etc.; ethers, such as dipropyl ether, dibutyl ether, etc.; or other solvents such as tetrahydrofuran, etc. The solvent may be used in any desired proportions, such as between 0.5 mole and 10 moles or more based on the ethylenic compound.

The hydrocyanation reaction normally proceeds very slowly at low temperature, and to achieve a practical reaction rate it is generally desirable to operate above about 50° C. The upper limit of temperature is dictated only by the decomposition point of the reactants. In practice, however, it is seldom desirable to operate above 200° C. A generally useful temperature range is that between 80 and 150° C. It may be noted that in general the catalysts decompose at relatively low temperature. It is possible that they are converted during the reaction to other cobalt derivatives having catalytic activity.

Since hydrogen cyanide boils at 26° C. and since the other reactants and solvents are in general volatile, it is necessary to operate in a closed, pressure-resistant vessel. Any suitable pressure vessel such as the conventional autoclaves or bombs, may be used. Reactors designed for continuous or semi-continuous operation may be used. For example, the cobalt carbonyl catalyst may be injected continuously under pressure into the reaction zone as a solution in an inert solvent such as benzene, the spent catalyst, which is in the form of a finely divided powder, may be filtered from the reaction product and any unreacted olefin and hydrogen cyanide recycled. If desired, agitation may be provided either internally or externally. The reaction proceeds at the autogenous pressure of the reactants and no additional pressure is necessary, although such may be used if desired. In this case, pressure may be provided by any inert gas such as nitrogen or air, or by an excess of a volatile unsaturate such as ethylene. Since the autogenous pressure of the reactants is not very high, it is unnecessary to use equipment designed for extremely high pressures.

The reaction time depends upon several factors including the nature of the unsaturate and the temperature. In general some nitrile will have formed within one or two hours at temperatures within the preferred range, i. e., above 80° C., and after 6 to 10 hours there is little further reaction and there is the danger of decomposing the reaction product. The nitrile or mixture of nitriles which form may be isolated by any suitable method such as direct distillation, steam distillation, crystallization if the nitriles are solid, etc. The unused hydrogen cyanide and ethylenic compound may be recovered and used again. As has already been mentioned, the cobalt carbonyl is decomposed, at least partly, during the reaction.

It has been observed that, in certain cases, the activity of the cobalt carbonyl catalysts may be enhanced by the presence in the reaction mixture of tertiary arylphosphines or arsines. The tertiary arylphosphine or arsine is desirably used in amounts of 0.01-0.3 mole, preferably 0.03-0.2 mole, per mole of insaturate. The influence of these promoters is shown in some of the examples.

The following examples in which parts are by weight are illustrative of the invention.

EXAMPLE I

A stainless steel reactor was charged with 40.5 parts of hydrogen cyanide, previously blown with nitrogen for two minutes and dried over calcium chloride, 86 parts of 1,3-butadiene and 17.1 parts of cobalt tetracarbonyl, $Co_2(CO)_8$, these reactants being in the molar ratio of 1.00/1.06/0.034 respectively. The tightness of the reactor was tested by pressuring with nitrogen and then venting to atmospheric pressure, leaving nitrogen as the gas above the reactants before sealing the reactor. The reactor was heated at 60° C. for one hour, then at 80° C. for one hour, then at 100° C. for one hour and finally at 120° C. for 8½ hours. After venting and cooling, the reaction charge was transferred to a reaction flask with 400 parts of water and codistilled with the water, additional water being added as required. The organic layer was separated from the aqueous distillate, dried over calcium chloride and fractionated. There was obtained 14.4 parts of a liquid boiling between 140 and 146° C. at atmospheric pressure and corresponding in composition to a pentenenitrile, i. e., an addition product of one mole of hydrogen cyanide to one mole of butadiene. In addition, there was obtained 0.58 part of higher boiling material having a nitrogen content corresponding to the formula $C_9H_{13}N$ and about 49 parts of undistillable residue including cobalt-containing residues formed during the reaction. Comparison of the infrared absorption spectrogram of the 140–146° C. fraction with those of authentic specimens of 3-pentenenitrile and 4-pentenenitrile showed that this material was a mixture of 77% 3-pentenenitrile, $NC-CH_2-CH=CH-CH_3$, and 23% 4-pentenenitrile $$NC-CH_2-CH_2-CH=CH_2$$

It is noteworthy that the cobalt catalyst must be present in the form of the carbonyl compound to promote the hydrocyanation reaction. There is no hydrogen cyanide addition when the metal itself is used as the catalyst in conjunction with carbon monoxide, as shown by the following experiment. A stainless steel reactor was charged with 27 parts of hydrogen cyanide, 55 parts of 1,3-butadiene and 25 parts of a cobalt-on-kieselguhr catalyst consisting of 25% metal and 75% kieselguhr. The reactor was pressured with nitrogen, vented, pressured to 300 lbs./sq. in. with carbon monoxide, revented to atmospheric pressure, repressured to 200 lbs./sq. in. of carbon monoxide and sealed. The reaction charge was heated ½ hour at 80° C., ½ hour at 100° C. and finally 9½ hours at 120° C. After cooling and venting, steam distillation of the residue gave as the sole reaction product 2 parts of vinylcyclohexene. No nitrogen-containing material was obtained.

EXAMPLE II

A stainless steel reaction vessel was charged with 17.6 parts of cobalt tetracarbonyl, 55.5 parts of 1,3-butadiene, 27.8 parts of hydrogen cyanide (partly purified as in Example I) and 131.5 parts of benzene, pressured to 250 lbs./sq. in. with nitrogen, then vented to atmospheric pressure. The reactor was heated at 80° C. for ½ hour, at 100° C. for 3½ hours, at 120° C. for one hour and finally at 140° C. for one hour, then cooled and vented. The reaction product was steam distilled and the organic layer was separated from the aqueous distillate and dried over calcium chloride. Fractionation yielded 24.2 parts of mixed pentenenitriles boiling at 143.8–144.7° C. Infrared spectrographic examination of this material showed that it consisted of 73.5% of 3-pentenenitrile and 26.5% of 4-pentenenitrile. In this experiment there was produced 0.37 mole of pentenenitrile per available mole of hydrogen cyanide (i. e., hydrogen cyanide not combined with the cobalt), a higher conversion than that obtained in the absence of solvent as in Example I. In addition, there was formed only 6.5 parts of undistillable residue.

When a similar experiment was run at lower temperature (60° C. for 20 hours) the proportion of 4-pentenenitrile in the reaction product was increased to 61%, as calculated from the infrared absorption spectrogram, the remaining 39% being 3-pentenenitrile. The conversion to pentenenitriles was considerably lower at this temperature, however.

EXAMPLE III

The procedure of Example II was repeated except that isopropyl alcohol was substituted for benzene as the solvent. The reaction product was isolated by filtering the charge removed from the bomb and fractionally distilling the filtrate. There was obtained 16.6 parts of mixed pentenenitriles which contained 97% of 3-pentenenitrile and 3% of 4-pentenenitrile, as shown by infrared spectrographic examination. In addition, there was obtained 0.6 part of a nitrogen-containing material boiling at 183–184° C. at 100 mm. pressure, $n_D^{25}$ 1.4521, and 0.3 part of a nitrogen-containing material boiling at 141–144° C. at 4 mm. pressure, $n_D^{25}$ 1.4723.

A similar result, in that the reaction product consisted almost exclusively of 3-pentenenitrile, was obtained when diethyl ether was used as the solvent, the reactants being in the same proportions as above and the reaction being carried out at 80° C. for ½ hour, then at 100° C. for 5½ hours. There was obtained 7.7 parts of pentenenitrile containing 97% of 3-pentenenitrile.

EXAMPLE IV

A stainless steel reaction vessel containing 108 parts of hydrogen cyanide, 260 parts of purified benzene, 162 parts of 1,3-butadiene and 51 parts of cobalt tetracarbonyl was heated for 14.5 hours at 130° C. under the autogenous pressure of the reactants. The contents were rinsed out with benzene, filtered, and the filtrate was distilled. The products of several such runs were then worked up together by careful fractionation, and the fractions obtained were identified by infrared analysis and preparation of suitable derivatives. The products obtained and the percent conversion based on the butadiene charged were as follows:

| | Percent |
|---|---|
| Vinylcyclohexene | 5 |
| 2-methyl-3-butenenitrile | 5 |
| 3-pentenenitrile | 36 |
| 4-pentenenitrile | 4 |
| Alpha, alpha'-dimethyl-succinonitrile | 3 |
| Alpha-methylglutaronitrile | 12 |
| Polymer | 10 |

EXAMPLE V

A stainless steel reactor was charged with 35.4 parts of 4-pentenenitrile, 34.8 parts of hydrogen cyanide, 7.3 parts of cobalt tetracarbonyl and 61.6 parts of benzene. The reactor was heated at 100° C. for 15 hours, after which the reaction product was filtered and the filtrate was fractionated. The distillate comprised 29.2 parts of unchanged 4-pentenenitrile, 7.8 parts of a dinitrile and 1 part of higher boiling, nitrogen-containing material. The dinitrile fraction consisted of 2-methylglutaronitrile,

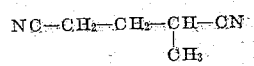

as shown by its boiling point 117° C. at 5 mm. pressure, its refractive index $n_D^{25}$ 1.4316, and by comparison between its infrared absorption spectrogram and that of an authentic sample of 2-methylglutaronitrile. Nitrogen analysis (Kjeldahl) gave 24.81% nitrogen as compared with the calculated value 25.91%. Hydrolysis gave a compound analyzing correctly for 2-methylglutaric acid.

EXAMPLE VI

A stainless steel reactor was charged with 54 parts of hydrogen cyanide, 114 parts of butene-1, 17.1 parts of cobalt tetracarbonyl and 66 parts of benzene. The reactor was purged once with nitrogen, closed and raised to a temperature of 100° C. where it was maintained with agitation for 15 hours. The product was filtered and distilled and the portion boiling between 92 and 140° C. was refractionated. There was obtained 3.3 parts of valeronitrile boiling at 138–144° C. and having a refractive index $n_D^{25}$ of 1.3922 to 1.4000.

Under somewhat different conditions involving higher temperatures and absence of solvent, the addition of hydrogen cyanide to butene-1 proceeds in the so-called "normal" manner, i. e., it gives as the reaction product 2-methylbutyronitrile, $CH_3CH(CN)CH_2$—$CH_3$, rather than valeronitrile. For example, when 56 parts of 1-butene, 13.9 parts of hydrogen cyanide (the commercial product containing about 2.5% of water) and 17 parts of cobalt tetracarbonyl were reacted for 8 hours at 130° C., there was obtained a 26.8% conversion of 2-methylbutyronitrile. This product when purified boiled at 126° C. and had a refractive index $n_D^{25}$ 1.3882 and a specific gravity $d_4^0$ 0.8063. It contained by analysis 16.06% nitrogen as compared with the calculated value, 16.9%.

The procedure just described but using carefully dried, stabilizer-free hydrogen cyanide prepared from sodium cyanide and sulfuric acid gave a 67.5% conversion to 2-methylbutyronitrile.

EXAMPLE VII

A silver-lined pressure vessel was charged with 27 parts of hydrogen cyanide and 17 parts of cobalt tetracarbonyl. The vessel was pressured with 110 atmospheres of ethylene at 24° C. and heated for one hour each at 70° C., 80° C., and 90° C. and finally for 7 hours at 100° C., in order to avoid the violent reaction experienced on raising the temperature too rapidly. The maximum pressure reached was 260 atmospheres at 80° C. and the final pressure was 195 atmospheres at 100° C. The reaction product was filtered from the catalyst and distilled. There was obtained 35 parts (64% conversion of the hydrogen cyanide) of propionitrile, B. P. 96–98° C., $n_D^{25}$ 1.3682.

EXAMPLE VIII

A stainless steel reaction vessel was charged with 104 parts of freshly distilled styrene, 2 parts of hydroquinone, 17 parts of cobalt tetracarbonyl and 27 parts of hydrogen cyanide, and heated for 8 hours at 130° C. and 380–355 lbs./sq. in. internal pressure. The vessel was then cooled, opened and the contents were rinsed out with benzene. After filtering off the spent catalyst, the filtrate was distilled and 68.5 parts (52.2% yield) of 2-phenylpropionitrile, B. P. 117° C. at 20 mm. pressure, was isolated. It contained 10.79% nitrogen as compared with the calculated value of 10.7%.

EXAMPLE IX

A stainless steel reactor was charged with 56 parts of butene-2, 13.5 parts of hydrogen cyanide, 17 parts of cobalt tetracarbonyl and 8.5 parts of triphenylphosphine, and heated for 9 hours at 130° C., the maximum pressure being 39 atmospheres. The product was filtered and distilled to give 17.8 parts (43% yield) of 2-methylbutyronitrile.

A similar experiment but without the triphenylphosphine gave a 9% yield of 2-methylbutyronitrile.

EXAMPLE X

A silver-lined pressure vessel was charged with 41 parts of 3-pentenenitrile, 27 parts of hydrogen cyanide, 17 parts of cobalt tetracarbonyl and 8.5 parts of triphenylphosphine and heated for 8 hours at 130° C. Working up of the reaction product gave 8.3 parts (15.4% yield) of 2-methylglutaronitrile.

A similar experiment but without the triphenylphosphine gave a 7% conversion to 2-methylglutaronitrile.

EXAMPLE XI

A silver-lined reaction vessel was cooled in a carbon dioxide-acetone bath, flushed with nitrogen and charged with 17 parts of cobalt tetracarbonyl and 27 parts of hydrogen cyanide prepared from sodium cyanide and sulfuric acid and redistilled over phosphorus pentoxide. The vessel was then evacuated while in the cold bath and charged with 150 parts of propylene. Upon heating the vessel to 130° C. the internal pressure rose to 110 atmospheres, then dropped to 90 atmospheres in one-half hour and remained there for 14.5 hours. The vessel was then cooled, opened, its contents rinsed out with ether, filtered and distilled. There was obtained 45 parts (65% conversion of hydrogen cyanide) of isobutyronitrile boiling at 100–105° C., $n_D^{25}$ 1.372. Its nitrogen content was 19.86% as compared with the calculated value 20.3%.

When this experiment was repeated with addition of 8.5 parts of triphenylphosphine, the reaction flashed suddenly at a temperature of 70° C. to a temperature of 183° C. and a pressure of 300 atmospheres. The vessel was cooled to 130° C. and maintained there for 14.5 hours at a pressure of 110–100 atmospheres. There was recovered 52 parts (75% conversion) of isobutyronitrile.

EXAMPLE XII

A cobalt carbonyl-hydrogen cyanide complex was prepared as follows: A weighed amount of cobalt tetracarbonyl was added to hydrogen cyanide maintained at the refluxing temperature (26° C.) and the gases evolved were passed through a cold trap to remove the entrained hydrogen cyanide and then through a dry test meter. The cobalt carbonyl was added over a one hour period, and the gas evolution continued for about 1½ hours more. A total of 2.5 moles of gas was evolved per atom of cobalt in the cobalt carbonyl used. Gas samples were taken at intervals and analyzed in an Orsat apparatus. Only hydrogen and carbon monoxide were present in appreciable amount (approximately in 1:4 ratio), the following gas sample being typical of the samples analyzed: carbon dioxide 0.2, unsaturate 1.0, oxygen 0.3, hydrogen 18.8, carbon monoxide 77.4, residual gas 2.2. The solid reaction product (cobalt carbonyl-hydrogen cyanide complex) was a blue powder containing 44.04% cobalt and 18.75% nitrogen which evolves carbon monoxide on treatment with aqueous potassium cyanide. A 13.5 part sample of this reaction product was placed in a pressure vessel with 27 parts of hydrogen cyanide and 150 parts of propylene. After 15 hours at 130° C. there was obtained 11 parts (16% conversion) of isobutyronitrile.

Other cobalt carbonyl-hydrogen cyanide complexes were prepared in the same manner, except that in one case the initial reaction temperature was 26° C. and no further external heat was applied and in another case the reaction temperature was 0° C. Carbon monoxide and hydrogen were evolved in substantially the same relative proportions as in the above experiment. The reaction products were again blue powders containing, respectively, 43.70% cobalt and 17.05% nitrogen, and 43.20% cobalt and 18.72% nitrogen. When used as catalysts in the hydrocyanation of propylene, the conversion to isobutyronitrile was about 10% with both products.

EXAMPLE XIII

A cobalt carbonyl-hydrogen cyanide complex was prepared as follows: A stainless steel reaction vessel was charged with 88 parts of purified benzene, 25 parts of cobalt tetracarbonyl, and 14 parts of hydrogen cyanide. The vessel was pressured with 200 lbs./sq. in. of nitrogen and heated for 8 hours at 130° C. The pressure rose from 725 lbs./sq. in. at 130° C. to 775 lbs./sq. in. in 3 hours and remained there for the rest of the run. When the vessel was cooled to room temperature, the residual pressure was 585 lbs./sq. in., indicating the loss of gas from the cobalt carbonyl. The contents of the vessel were rinsed out with benzene. The reaction product was a fine purple powder, insoluble in benzene, containing 37.6% cobalt and 21.4% nitrogen.

The cobalt carbonyl-hydrogen cyanide complex isolated above was placed in a silver-lined reactor with 27 parts of hydrogen cyanide and 150 parts of propylene. During the first 4 hours at 130° C. the pressure dropped from 290 to 215 atmospheres. After 15 hours the pressure was 210 atmospheres. There was obtained 29 parts (42% conversion of hydrogen cyanide) of isobutyronitrile.

A catalyst having similar activity was produced by reacting cobalt tetracarbonyl with hydrogen cyanide at 160° C. in furan as solvent. This complex contained 23.65% cobalt and 37.78% nitrogen.

EXAMPLE XIV

A mixture of 56 parts of butene-1, 13.5 parts of hydrogen cyanide and 17 parts of cobalt tetracarbonyl was reacted for 8 hours at 130° C., giving 25.5% conversion to 2-methylbutyronitrile. The solid reaction product of cobalt carbonyl with hydrogen cyanide remaining in the reaction vessel contained 37.54% cobalt and 16.27% nitrogen. This "spent" catalyst was in turn used as hydrocyanation catalyst in a mixture consisting of 56 parts of butene-1, 13.5 parts of hydrogen cyanide and 7 parts of the "spent" catalyst. Reaction at 130° C. for 8 hours gave 5.8% conversion to 2-methylbutyronitrile. The residual solid contained 31.59% cobalt and 27.51% nitrogen, showing that the "spent" catalyst from the first run had reacted further with hydrogen cyanide in the second run, giving a product higher in nitrogen content and lower in cobalt content.

EXAMPLE XV

A silver-lined pressure vessel was charged with 27 parts of the mercury salt of cobalt carbonyl hydride, 50 parts of hydrogen cyanide and 175 parts of propylene, and heated at 130° C. for 15 hours. The pressure dropped from a maximum of 275 atmospheres to 100 atmospheres in two hours. There was recovered 79 parts (63.1% yield) of isobutyronitrile.

The mercury salt of cobalt carbonyl hydride used in this and the following example was prepared as follows:

Twenty-five parts of finely divided cobalt metal, 57.5 parts of mercuric chloride, 27 parts of copper powder and 71.3 parts of anhydrous ether were charged into a copper-lined pressure vessel which had previously been swept free of oxygen by means of a stream of dry nitrogen. The vessel was adjusted to maintain a pressure of 1000 atmospheres of carbon monoxide and heated for one hour at 150° C., one hour at 160° C. and ten hours at 170° C. The reaction product was extracted three times with 50 parts of ether, then the solid residue was extracted three times with 50 parts of methylene chloride. The ether and methylene chloride extracts gave 27 and 31 parts, respectively, of the mercuric salt of cobalt carbonyl hydride, the total yield being 52% of the theoretical.

Analysis

Calculated for $Hg[Co(CO)_4]_2$: Hg, 38.0%; Co, 21.76%; C, 17.71%.

Found: Hg, 37.00%; Co, 21.76%; C, 17.73%.

The mercuric salt of cobalt carbonyl hydride is a bright orange-yellow solid, stable in air, and slowly sublimable at temperatures below the decomposition point (70° C. at 1 mm. pressure). It is insoluble in water, soluble in ether, benzene and methylene chloride. It is attacked slowly by concentrated oxidizing acids but is not noticeably affected by treatment with concentrated hydrochloric acid.

EXAMPLE XVI

A stainless steel reaction vessel was cooled and charged with 27 parts of hydrogen cyanide, 55.2 parts of 1,3-butadiene, 27.1 parts of the mercuric salt of cobalt carbonyl hydride and 132 parts of benzene. The vessel was closed and heated under autogenous pressure at 80° C. for ½ hour, at 100° C. for 3.5 hours, at 120° C. for one hour and at 140° C. for one hour. The reaction product was filtered to remove the solid residue, which was washed with 4.5 parts of benzene. The combined benzene solutions were fractionally distilled to yield 4.8 parts of a material boiling at 112–138° C. which contained 2-methyl-3-butenenitrile, 35 parts of a mixture of 3-pentenenitrile and 4-pentenenitrile, and 7.9 parts of higher boiling nitriles which contained 2.9 parts of 2-methylglutaronitrile. The mixture of pentenenitrile was shown by infrared spectrograms to comprise 25% of 4-pentenenitrile and 75% of 3-pentenenitrile.

EXAMPLE XVII

Butadiene/cobalt carbonyl hydride was prepared as described in application Serial No. 779,837, already referred to, by heating cobalt carbonyl and isopropanol at 130° C. under 100 atmospheres carbon monoxide pressure while injecting 1,3-butadiene continuously. The product was isolated as a liquid boiling at 32–33° C. at 2 mm. pressure.

A stainless steel reaction vessel was charged with 4.6 parts of butadiene/cobalt carbonyl hydride, 56.8 parts of 1,3-butadiene, 27 parts of hydrogen cyanide and 132 parts of benzene. The vessel was pressured with carbon monoxide to a pressure of 600 lbs./sq. in., closed and heated at 80° C. for ½ hour, then at 100° C. for 10 hours. The reaction product was filtered to remove a solid residue, which was washed with 8.5 parts of benzene. The combined filtrate and washings were fractionally distilled, yielding 6.9 parts of mixed pentenenitriles. Infrared spectrograms showed that the pentenenitrile fraction contained 28.5% of 4-pentenenitrile, the remainder being 3-pentenenitrile.

EXAMPLE XVIII

A stainless steel bomb was charged with 56 parts of octene-1, 17 parts of cobalt tetracarbonyl, 8.5 parts of triphenylphosphine and 27 parts of hydrogen cyanide and heated for 8 hours at 130° C., the maximum pressure reached being 650 lbs./sq. in. The contents of the bomb were rinsed out with ether, filtered and distilled. There was obtained 16.5 parts (23.7% yield) of alpha-methylcaprylonitrile, B. P. 209° C. at 751 mm. pressure, $n_D^{25}$ 1.4181.

*Analysis*

Calculated for $C_9H_{17}N$: C, 77.7%; H, 12.2%; N, 10.1%.
Found: C, 77.6%, 77.3%; H, 11.6%, 11.7%; N, 10.2%, 10.1%.

EXAMPLE XIX

A stainless steel pressure vessel was charged with 22 parts of methyl 5-hexenoate, 27 parts of hydrogen cyanide and 17 parts of cobalt tetracarbonyl and heated at 130° C. for 8 hours, the maximum pressure being 28 atmospheres. Distillation of the product after filtering off the spent catalyst gave 4.9 parts (19.3% conversion) of a mole for mole hydrogen cyanide adduct of the formula $C_8H_{13}O_2N$.

*Analysis*

Calculated for $C_8H_{13}O_2N$: C, 61.9%; H, 8.4%; N, 9.05%.
Found: C, 61.85%; H, 8.70%; N, 8.77%.

EXAMPLE XX

A stainless steel bomb was charged with 19 parts of 5-hexenenitrile, 17 parts of cobalt tetracarbonyl and 27 parts of hydrogen cyanide and heated for 8 hours at 130° C. After filtering and distilling the product, there was obtained 8.7 parts (35.6% conversion) of a dinitrile of formula $C_7H_{10}N_2$, $n_D^{25}$ 1.4348, which was probably alpha-methyladiponitrile.

*Analysis*

Calculated for $C_7H_{10}N_2$: N, 22.9%.
Found: N, 22.7%.

The 5-hexenenitrile used in this example was prepared according to the general disclosure of application Serial No. 101,905, filed on June 28, 1949, by Albisetti and Fisher, by heating a mixture of 50 parts of acrylonitrile and 200 parts of propylene for four hours at 240° C. and 1000 atmospheres pressure. Distillation of the reaction product gave 5-hexenenitrile, B. P. 162° C. at atmospheric pressure.

EXAMPLE XXI

A stainless steel reactor was charged with 68 parts of isoprene, 88 parts of benzene, 17 parts of cobalt tetracarbonyl and 27 parts of hydrogen cyanide and heated at 130° C. for 18.5 hours, the maximum pressure being 725 lbs./sq. in. The contents of the reactor were rinsed out with benzene, filtered and distilled. There was obtained 48 parts (50.5% yield) of a mononitrile which upon careful fractionation was found to consist of 75% of 4-methyl-3-pentenenitrile and 25% of 3-methyl-3-pentenenitrile. The first one had a boiling point of 165° C. and a refractive index $n_D^{25}$ of 1.4330. It was further identified by infrared analysis and by hydrogenation and hydrolysis to 4-methylpentanoic acid. The second one, which apparently formed a constant boiling mixture with the dimer of isoprene which also formed, was identified by infrared analysis and by hydrogenation and hydrolysis to 3-methylpentanoic acid.

EXAMPLE XXII

A stainless steel bomb was charged with 27 parts of hydrogen cyanide, 17 parts of cobalt tetracarbonyl, and 54 parts of vinylcyclohexene (the dimer of 1,3-butadiene) and heated at 130° C. for 19.5 hours, the pressure being 700–675 lbs./sq. in. There was obtained 9.5 parts (14.1% yield) of the mononitrile, alpha-methyl-3-cyclohexene-1-acetonitrile.

*Analysis*

Calculated for $C_9H_{13}N$: C, 80.0%; H, 9.6%; N, 10.4%.
Found: C, 79.48%; H, 9.89%; N, 10.36%.

The product was further identified by hydrogenation of the double bond, followed by hydrolysis to an acid identical, by mixed melting point, with the acid obtained by hydrogenation of the aromatic ring in an authentic sample of hydratropic acid.

EXAMPLE XXIII

A stainless steel reactor was charged with 41 parts of biallyl, 27 parts of hydrogen cyanide and 17 parts of cobalt tetracarbonyl and heated for 8 hours at 130° C. There was obtained 12.7 parts of a mononitrile fraction, B. P. 150–160° C. at 760 mm. pressure, and 5.2 parts of a dinitrile fraction, B. P. 130–150° C. at 20 mm. pressure.

EXAMPLE XXIV

A stainless steel reactor was charged with 60 parts of dicyclopentadiene, 27 parts of hydrogen cyanide, 8.5 parts of triphenylphosphine and 17 parts of cobalt tetracarbonyl and heated at 130° C. for 15.5 hours, the pressure being 660–625 lbs./sq. in. There was obtained 17.4 parts (24% yield) of a mononitrile having the formula $C_{11}H_{13}N$.

*Analysis*

Calculated for $C_{11}H_{13}N$: N, 8.8%.
Found: N, 8.5%.

EXAMPLE XXV

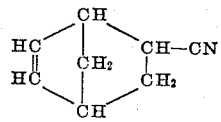

Bicyclo [2.2.1]-5-heptene-2-carbonitrile, was prepared by condensing cyclopentadiene with acrylonitrile (see Bruson, J. Am. Chem. Soc. 64, 2457–61, (1942)). A stainless steel reactor was charged with 167 parts of bicyclo [2.2.1]-5-heptene-2-carbonitrile, 54 parts of hydrogen cyanide, 51 parts of cobalt tetracarbonyl and 25 parts of triphenylphosphine and heated for 8 hours at 130° C. There was recovered 30 parts of starting material and 126 parts (62% conversion) of a dinitrile which was a semi-solid at room temperature. This was a mixture of position and/or geometrical isomers. A solid and a liquid fraction were obtained by filtration and both analyzed correctly for 2,5 (or 6)-norcamphanedicarbonitrile,

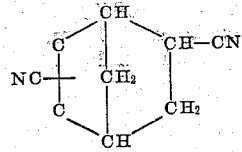

(the hydrogen atoms on the left side of the formula here and below have been omitted to indicate that the position of the cyano group is not known).

*Analysis*

Calculated for $C_9H_{10}N_2$: C, 74.0%; H, 6.8%; N, 19.2%; mol. wt., 146.
Found (on liquid fraction): C, 74.32%; H, 6.74%; N, 18.16%; mol. wt., 151, 145.

On catalytic hydrogenation at 125° C. and 1800–2000 lbs./sq. in. hydrogen pressure in the presence of anhydrous ammonia and Raney cobalt catalyst, either the liquid or the solid fraction or their mixture gives 2,5 (or 6)-di(aminomethyl)norcamphane

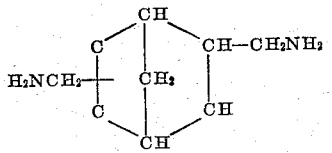

The diamine is a liquid boiling at 116° C. at 8 mm. pressure, $n_D^{25}$ 1.5082, neutralization equivalent 76.6 (calculated: 77.1). This diamine is a useful intermediate in the preparation of polyamides. For example, with adipic acid it gives a transparent polyamide melting at about 200° C. With terephthalic acid it gives a transparent polyamide melting at about 275° C. and having an intrinsic viscosity of 0.62 and a water absorption of about 10%.

EXAMPLE XXVI

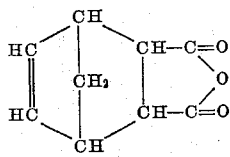

Bicyclo [2.2.1]-5-heptene-2,3-dicarboxylic anhydride was prepared by reacting maleic anhydride with cyclopentadiene (Diels and Alder, Ann. 460, 98–122 (1928)). A stainless steel pressure vessel was charged with 164 parts of bicyclo [2.2.1]-5-heptene-2,3-dicarboxylic anhydride, 54 parts of hydrogen cyanide, 17 parts of cobalt tetracarbonyl and 20 parts of triphenylphosphine and heated for 8 hours at 130° C. There was obtained 54 parts (28% conversion) of a high boiling syrup which upon two recrystallizations from a toluene-xylene mixture, gave a mixture of isomers melting at 155–167° C. This mixture had a composition corresponding to 5 (or 6)-cyano-bicyclo [2.2.1] heptane-2,3-dicarboxylic anhydride.

*Analysis*

Calculated for $C_{10}H_9O_3N$: C, 62.9%; H, 4.7%; N, 7.3%.
Found: C, 63.17%; H, 4.99%; N, 7.81%.

In the process of this invention there may be employed other unsaturated compounds having one or more carbon-to-carbon double bonds aliphatic in character. In addition to the compounds used in the examples there may be mentioned, as suitable unsaturates, pentene-1, pentene-2, hexene-1, hexene-3, alpha-methylbutadiene, allylbenzene, dodecene-1, hexadecene-1, octadecene-1, vinylnaphthalene and the like. The process is applicable to unsaturated compounds having substituents such as nitrile, halogen, hydroxyl, alkoxy, carboxy, etc., particularly in cases where these substituents are more than one carbon removed from the double bond, i. e., are "isolated" or "independent" and thus exert no activating influence. However, the special usefulness of the process lies in its application to ethylenic hydrocarbons since this class of compounds is particularly resistant to hydrocyanation by the methods heretofore known, and to ethylenically unsaturated aliphatic or cycloaliphatic nitriles where the double bond is more than one carbon removed from the cyano group, and in particular to unsaturated hydrocarbons or nitriles having a maximum of 12 carbon atoms. A specifically useful embodiment of the invention is the hydrocyanation of unsaturated hydrocarbons of 2 to 12 carbon atoms in which the aliphatic unsaturation is only ethylenic and is in an open chain, and in which each of the ethylenically bonded carbons bears at least one hydrogen atom. Olefins having a doubly bonded carbon free from hydrogen, e. g., isobutene, are not preferred, since the addition product is formed in less advantageous amount and tends to be polymeric. A specific and important use of the process is the hydrocyanation with cobalt carbonyl of 1,3-butadiene since the resulting nitriles may be converted to acids or amines for use as intermediates in the synthesis of polyamides.

As shown in some of the examples, it is sometimes possible under certain conditions to direct the reaction so that addition of hydrogen cyanide takes place contrary to Markownikoff's rule. While it is not possible to lay down precise rules as to how this can be accomplished, it appears that "abnormal" or "reverse" addition of hydrogen cyanide is favored by low temperatures and the presence of benzene as the diluent.

The cobalt carbonyl/hydrogen cyanide adducts described herein are useful, as already disclosed, as hydrocyanation catalysts. The nitriles obtainable by this process are useful as chemical intermediates in the synthesis of acids, amines, amides, polyamides, etc. They are also useful per se as insecticides, fumigants, solvents, etc.

The foregoing detailed description has been given for clearness of understanding only and no unnecessary limitations are to be understood therefrom. The invention is not limited to the exact details shown and described for obvious modifications will occur to those skilled in the art.

What is claimed is:

A product of the reaction, at 0–200° C., of anhydrous hydrogen cyanide with cobalt carbonyl, $Co_2(CO)_8$, said product being blue-purple in color, of 23–44% cobalt content and 16–38% nitrogen content, soluble in aqueous potassium cyanide solution with the evolution of carbon monoxide to an aqueous solution which on heating gives potassium cobalticyanide.

PAUL ARTHUR, JR.
BURT CARLTON PRATT.

References Cited in the file of this patent

UNITED STATES PATENTS

| Number | Name | Date |
| --- | --- | --- |
| 2,385,741 | Teter | Sept. 25, 1945 |
| 2,455,995 | Harris | Dec. 14, 1948 |

OTHER REFERENCES

Williams: "Cyanogen Compounds," pages 106, 107, 108 (1948), Edward Arnold and Co., London.

Hodgman: "Handbook of Chemistry and Physics," 27th ed., pages 374, 375 (1943), Chemical Rubber Publishing Co., Cleveland, Ohio.

Job et al.: "Comptes Rendu," vol. 177, pages 188–191 (1923).

Treadwell et al.: "Helvetia Chimica Acta," volume 26, pages 10–17 (1943).

Hume et al.: "J. Am. Chem. Soc.," vol 71, No. 3, pages 867–869, March 1949.